Oct. 6, 1931.    R. J. WINSOR    1,826,113
STEERING MEANS AND AXLE ASSEMBLY FOR VEHICLES
Filed Feb. 13, 1929    2 Sheets-Sheet 1
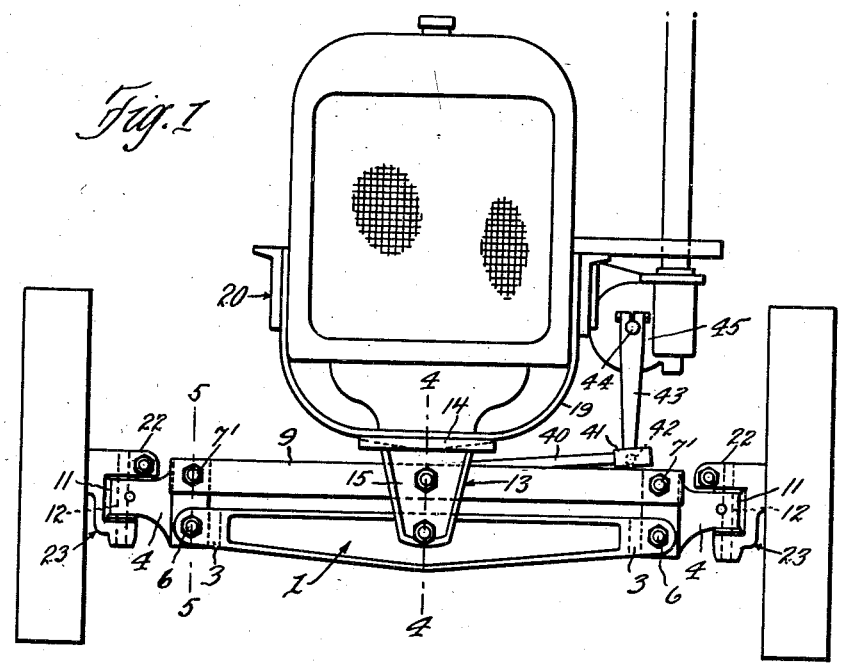
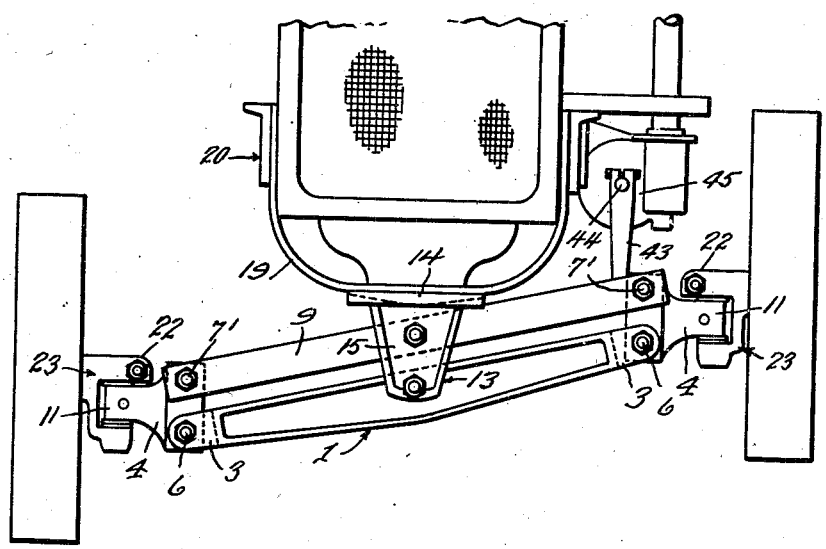

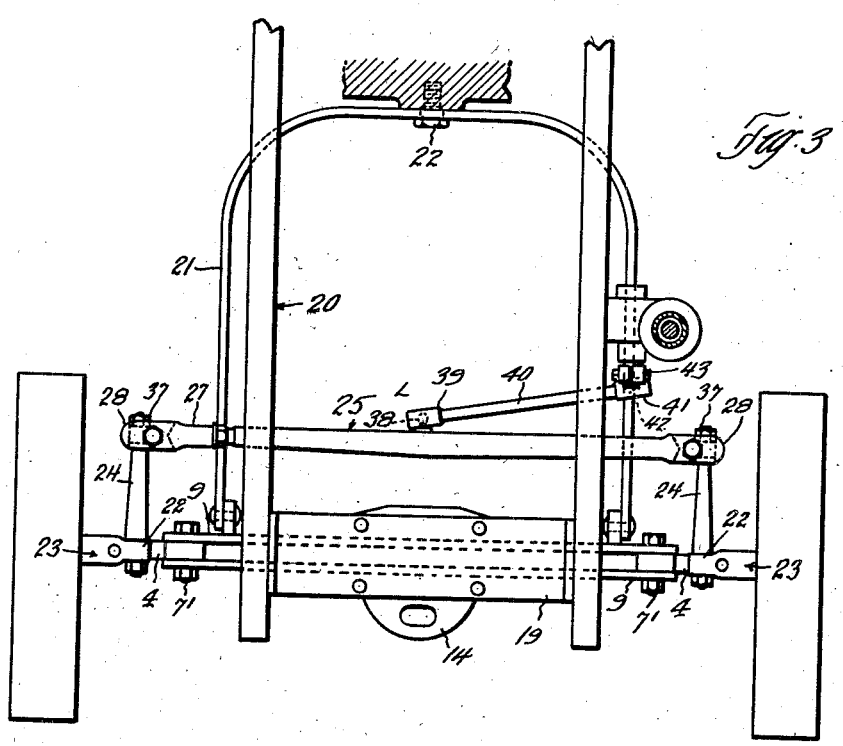
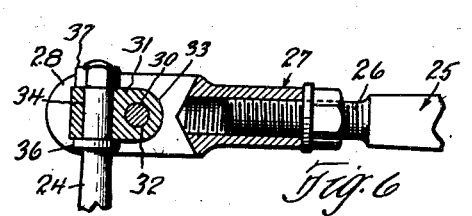
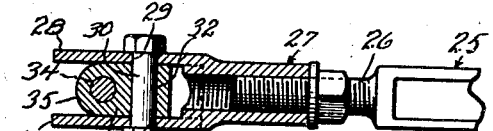
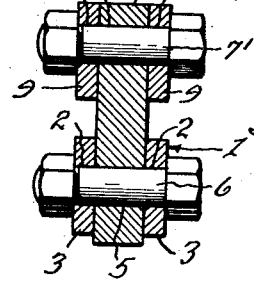
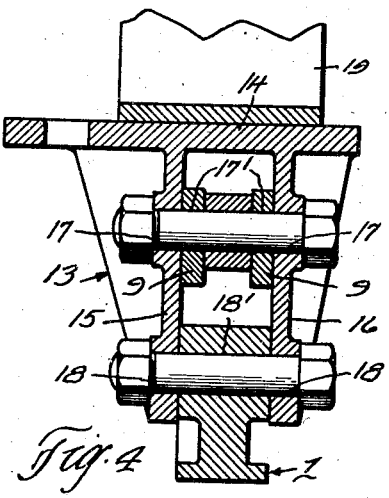

Patented Oct. 6, 1931

1,826,113

UNITED STATES PATENT OFFICE

ROY J. WINSOR, OF BUCYRUS, OHIO

STEERING MEANS AND AXLE ASSEMBLY FOR VEHICLES

Application filed February 13, 1929. Serial No. 339,570.

This invention relates to improvements in axle assemblies, and particularly to front axle assemblies especially applicable to tractors, graders and the like.

In axle assemblies wherein the axle is pivoted at its center to the vehicle frame and the guiding wheels are mounted for pivotal movement about vertically disposed knuckle pins carried by the axle, it is apparent that, whatever may be the angular disposition of the axle with reference to the horizontal, the wheels will maintain an angle normal to that of the axle, with the result that, if one of such wheels is depressed with respect to the other, both knuckle pins will assume an angle to the vertical which will render steering difficult.

It is an object of this invention to overcome the above objections by a front axle assembly wherein the guiding wheels are maintained in a substantially vertical position regardless of the angular disposition of the axle.

A still further object is to provide steering means whereby the guiding wheels may be conveniently and effectively actuated regardless of the angular disposition of the axle.

Other objects will become apparent from the description of the drawings in which Fig. 1 represents a front elevation of a vehicle of the type referred to equipped with my invention and showing the positions of the wheels and axle when the wheels are at substantially the same elevation; Fig. 2 a view similar to Fig. 1 showing the positions of the parts when the wheels are at different elevations; Fig. 3 a plan view of the parts shown in Figs. 1 and 2, the motor being removed; Figs. 4 and 5 are details in section taken respectively on the line 4—4 and 5—5 of Fig. 1; and Figs. 6 and 7 are sections taken at right angles to each other and showing the connection between one of the spindles and the tie rod.

The axle assembly comprises a lower axle member 1, preferably of I-beam cross-section, provided with bearing openings 2 at the ends thereof and with a centrally located bearing opening 18'. The ends of this axle member are each bifurcated inwardly to a point inside of the bearing openings, thereby providing parallel spaced bearing arms 3. Within the bifurcations at each end is received the lower inside corner of a spindle bracket 4 which is provided with a bearing opening 5 for registration with the openings 2, to receive a pivot bolt 6. Each spindle bracket is further provided with a bearing opening 7 spaced from and above the opening 5 and in vertical alignment therewith when in operative position. This opening 7 is adapted to receive a second pivot bolt 7' which passes through bearing openings 8 in each end of two bars 9—9 arranged above and parallel with the axle member 1 and comprising an upper axle member. The bars 9—9 are further provided with centrally located bearing openings 17'. The center-to-center distance between the openings 8 in each bar is the same as that between the openings 2. Each spindle bracket 4 is provided with an outwardly extending arm 11 which is provided with an enlarged outer portion to provide a bearing opening 12 adapted to receive the usual vertically disposed pivot pin or knuckle pin.

With this much of the device assembled, the pivot points at corresponding ends of the bars and lower axle member, on the spindle brackets, are in vertical alignment, as are the centrally disposed openings 18' and 17'. Regardless of the angular displacement of the bars and lower axle member from a horizontal position, they will maintain their parallelism and the pivot points their vertical alignment.

A casting 13 is provided with a horizontally disposed supporting plate 14 and downwardly disposed spaced clamping arms 15 and 16 each provided with a like pair of bearing openings 17 and 18 suitably spaced apart on a vertical line, the openings 17 and 18 of one arm being in horizontal alignment respectively with the openings 17 and 18 of the other. The vertical spacing of these openings is such that, when the casting is in position so that the clamping arms embrace the axle and bars, the openings 17 will align with the openings 17' and the openings 18 will align with the openings 18', thereby permitting introduction of suitable pivot bolts or pins. When so assembled, due to the spacing of the openings in the casting, clearance is provided between the bars 9 and the lower face of the bearing plate 14 to permit pivotal motion of the bars.

A suitable means, such as the U-shaped element 19, is bolted or otherwise secured to the top face of the bearing plate 14 to provide attachment of the axle assembly to the vehicle frame 20, so that the vehicle load will be centrally supported and a space provided between the arms of the U to receive any vehicle parts to be there located.

A U-shaped torsion rod 21 is pivotally mounted, as at 22, to any suitable part of the vehicle, rearwardly of the axle assembly, the pivot point being in alignment with and in the same horizontal plane as the pivot point 18, the free ends of the U-shaped rod being secured to the ends of the axle 1 in any suitable manner. By this construction, rigidity is given to the axle assembly while at the same time freedom of pivotal movement is permitted.

Secured to each of the inwardly projecting arms 22 of the wheel spindles 23 are steering arms 24 which project rearwardly a suitable distance and are connected together at their free ends by a tie-rod 25. This tie-rod may be a single piece or may be made adjustable in length by providing screw-threaded connecting means 26 between a major portion of the same and a minor end portion 27. Whatever construction of rod may be employed, the ends are constructed in the form of yokes 28, the arms of the yokes being provided with pivot-pin openings 29 to receive pins 30.

Mounted for pivotal movement on each pin 30, and embraced within the appropriate yoke arms 28, is a trunnion 31 provided with the pin-receiving opening 32 adjacent one end thereof to receive the pin 30 and having that end of the trunnion semi-cylindrical in contour as at 33, the curvature of this surface being concentric with the opening 32. The opposite end of the trunnion is provided with an opening 34 extending therethrough at right angles to the opening 32 and having that end of the trunnion also semi-cylindrical in contour, as at 35, the curvature of this surface being concentric with the opening 34. This latter opening is adapted to receive the free end of the steering arm 24, which is reduced in diameter for this purpose, thereby providing a shoulder 36 against which the trunnion bears.

The free end of the steering arm is preferably extended and threaded to receive a nut 37 for secure connection of the trunnion and arm. With this construction, a simple pivotal connection between the tie-rod and steering arms is provided whereby ready steering is permitted for any angular disposition of the axle assembly.

Located at the longitudinal center of the tie-rod 25 is a ball connector 38 adapted to be received by a socket 39 in one end of the connecting rod 40. The opposite end of the rod 40 is provided with a socket 41 adapted to receive a ball 42 on the free end of a steering-gear arm 43. The opposite end of the arm 43 is keyed or otherwise secured to the worm gear shaft 44 of the steering gear 45. By centrally locating on the tie-rod 25 the ball-and-socket connection between the tie-rod and the rod 40, no appreciable translation thereof will occur when the axle assembly is displaced from the normal horizontal position. Such displacement will be through a rotation of the assembly about the pivot points 17 and 18, and as the ball 38 is substantially on this axis of rotation, no material translation of the ball will occur and therefore no appreciable tendency to actuate the steering gear.

In operation, when a vehicle equipped with the disclosed structure is traveling over uneven ground or an uneven roadway, either guiding wheel is free to rise in riding over an obstruction and to lower in traversing a depression without shifting the guiding wheels from a substantially vertical position. By reason of this action, it is possible to keep the guiding wheels tracking in their normal position; and it is an obvious result of this condition that the guiding or steering wheels will remain in an upright position at all times regardless of the angle which the axle may assume, due to irregularities in the surface which the wheels are traversing. One wheel may be several inches higher than the other, due to the slope or unevenness of the ground, but the wheels and their steering knuckle pins will still remain in a vertical position.

Having thus described my invention, what I claim is:

1. In combination, an axle, a spindle bracket pivotally connected to each end of the axle, a pair of bars pivotally connected at their ends to said spindle brackets and in spaced parallel relation to said axle, the center-to-center distance between the pivotal mountings of the respective bars being substantially the same and substantially equal to that between the axle mountings, a vehicle supporting unit pivotally mounted on both bars and the axle at points substantially midway of the pivotal mountings thereof, a wheel spindle pivotally mounted on each bracket, a steering arm rigidly secured to each spindle and extending rearwardly therefrom, each steering arm having a reduced threaded section on the outer end thereof, a tie rod having its ends bifurcated, and means for securing each end of said tie-rod to the outer end of a steering arm, said means comprising a trunnion adapted to be received within the bifurcation, means for vertical pivotal mounting of said trunnion within the bifurcation, said trunnion being provided with a horizontally extending opening for the reception of said reduced end of a steering arm, and a nut for threaded engagement with said arm to lock said trunnion and arm in operative engagement.

2. In combination, an axle, a spindle bracket pivotally connected to each end of the axle, a pair of bars pivotally connected at their ends to said spindle brackets and in spaced parallel relation to said axle, the center-to-center distance between the pivotal mountings of the respective bars being substantially the same and substantially equal to that between the axle mountings, a vehicle supporting unit pivotally mounted on both bars and the axle at points substantially midway of the pivotal mountings thereof, a wheel spindle pivotally mounted on each bracket, a steering arm rigidly secured to each spindle and extending rearwardly therefrom, each steering arm having a reduced threaded section on the outer end thereof, a tie rod having its ends bifurcated, and means for securing each end of said tie-rod to the outer end of a steering arm, said means comprising a universal joint.

In testimony whereof, I hereunto affix my signature.

ROY J. WINSOR.